United States Patent
Schanke et al.

(10) Patent No.: US 9,944,422 B2
(45) Date of Patent: Apr. 17, 2018

(54) SLEEVE APPLICATOR MACHINE AND RELATED METHOD OF OPERATION

(71) Applicant: Brady Worldwide, Inc., Milwaukee, WI (US)

(72) Inventors: Robert L. Schanke, New Berlin, WI (US); Robert F. Behlmer, Wauwatosa, WI (US); Richard L. Carriere, Oak Creek, WI (US)

(73) Assignee: Brady Worldwide, Inc., Milwaukee, WI (US)

( * ) Notice: Subject to any disclaimer, the term of this patent is extended or adjusted under 35 U.S.C. 154(b) by 489 days.

(21) Appl. No.: 14/663,685

(22) Filed: Mar. 20, 2015

(65) Prior Publication Data

US 2015/0284126 A1     Oct. 8, 2015

Related U.S. Application Data

(60) Provisional application No. 61/975,308, filed on Apr. 4, 2014.

(51) Int. Cl.
*B65C 3/02*     (2006.01)
*B65C 9/00*     (2006.01)
(Continued)

(52) U.S. Cl.
CPC ............ *B65C 9/0015* (2013.01); *B29C 63/18* (2013.01); *B29C 67/0022* (2013.01); *B65C 3/02* (2013.01);
(Continued)

(58) Field of Classification Search
CPC ......... B65B 43/34; B65B 43/42; B65B 43/54; B65C 3/02; B29C 63/18
(Continued)

(56) References Cited

U.S. PATENT DOCUMENTS 3,675,305 A * 7/1972 Heisler ................. B21F 45/004
                                                                   140/75
4,182,225 A * 1/1980 Reid ....................... B26D 1/60
                                                                   156/426

(Continued)

FOREIGN PATENT DOCUMENTS

| EP | 0218000 A1 | 4/1987 |
| EP | 0581385 A1 | 2/1994 |
| GB | 2405849 A | 3/2005 |

OTHER PUBLICATIONS

W. H. Brady Co.; BPA System Operator's Manual; Copyright 1985; 9 pages; Milwaukee, Wisconsin.
(Continued)

*Primary Examiner* — Andrew M Tecco
*Assistant Examiner* — Chelsea Stinson
(74) *Attorney, Agent, or Firm* — Quarles & Brady LLP

(57) ABSTRACT

A sleeve applicator machine is used to remove and open a sleeve from a carrier for application of the sleeve around an elongated object such as a wire. A mandrel is inserted into an opening of an unopened sleeve while the sleeve is still supported by the carrier. Once the mandrel is inserted into the sleeve, the mandrel is lifted to separate the unopened sleeve from the carrier. While still on the mandrel, the sleeve (which is now in a semi-opened state) is positioned between a separable pair of sleeve-opening dies in which the dies are in an opened position. The dies are closed or brought together around the sleeve and mandrel to compress the sleeve to a fully open state. At this point and with the dies holding the sleeve open, the mandrel may be withdrawn from the sleeve and a wire or other elongated object inserted into the opening of the sleeve.

11 Claims, 7 Drawing Sheets

(51) Int. Cl.
*B29C 67/00* (2017.01)
*B29C 63/18* (2006.01)
*B29K 105/00* (2006.01)
*B29L 23/00* (2006.01)

(52) U.S. Cl.
CPC .... *B29C 67/0014* (2013.01); *B29K 2105/258* (2013.01); *B29L 2023/22* (2013.01); *B65C 2009/0018* (2013.01)

(58) Field of Classification Search
USPC .................................. 53/399, 459, 564, 567
See application file for complete search history.

(56) References Cited

U.S. PATENT DOCUMENTS

| | | | |
|---|---|---|---|
| 4,243,466 A | 1/1981 | Lindee | |
| 4,446,616 A | 5/1984 | Waterman | |
| 4,451,965 A | 6/1984 | Carlomagno | |
| 4,574,440 A | 3/1986 | Wirth et al. | |
| 4,655,129 A * | 4/1987 | Wirth | B65C 3/02 101/35 |
| 4,865,895 A | 9/1989 | Vlamings et al. | |
| 4,868,023 A | 9/1989 | Ryan et al. | |
| 4,922,683 A | 5/1990 | Connolly | |
| 4,944,825 A | 7/1990 | Gifford et al. | |
| 5,024,042 A * | 6/1991 | Meyer | B65B 39/007 53/168 |
| 5,024,049 A | 6/1991 | Strub et al. | |
| 5,060,367 A | 10/1991 | Vandevoorde | |
| 5,275,674 A * | 1/1994 | Sayyadi | B29C 53/40 156/468 |
| 5,398,395 A | 3/1995 | Woolls | |
| 5,425,826 A * | 6/1995 | Sayyadi | B29C 53/40 156/267 |
| 5,483,783 A | 1/1996 | Lerner et al. | |
| 5,569,351 A | 10/1996 | Menta et al. | |
| 6,923,884 B2 | 8/2005 | Eiban | |
| 7,024,841 B2 | 4/2006 | Krämer et al. | |
| 8,621,745 B2 | 1/2014 | Deonarine et al. | |
| 2002/0084020 A1* | 7/2002 | Scott | B65C 3/02 156/215 |
| 2009/0056880 A1* | 3/2009 | Johnson | B65C 3/02 156/537 |
| 2013/0061443 A1 | 3/2013 | Fengler et al. | |
| 2013/0269834 A1* | 10/2013 | Haschke | B65B 5/00 141/390 |

OTHER PUBLICATIONS

PCT International Search Report and Written Opinion, PCT/US2015/022215, dated Jul. 9, 2015, 10 pages.

\* cited by examiner

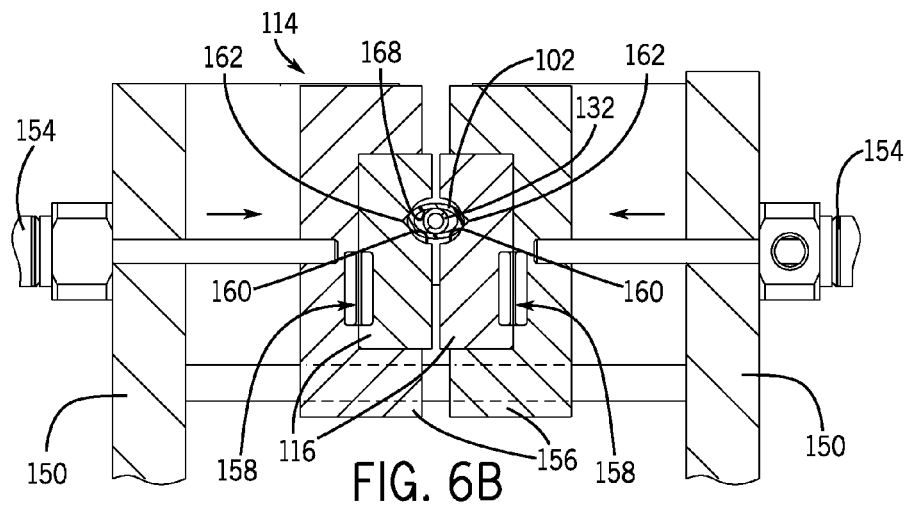
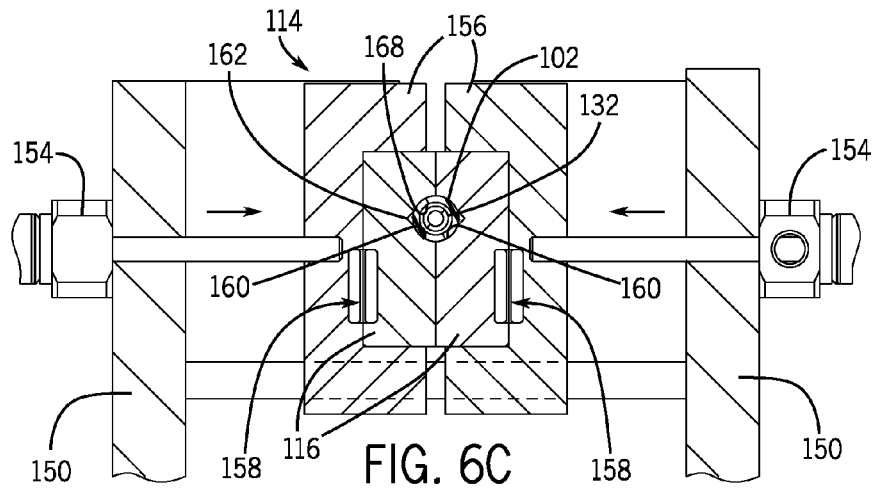
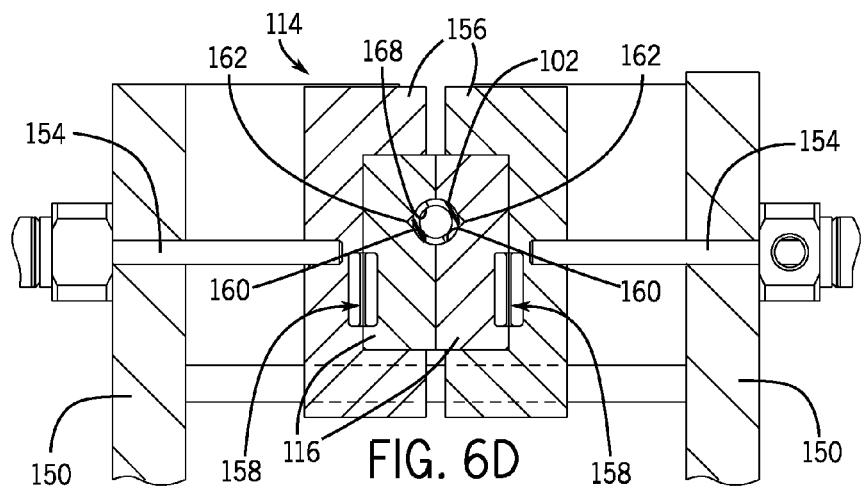

SLEEVE APPLICATOR MACHINE AND RELATED METHOD OF OPERATION

CROSS-REFERENCE TO RELATED APPLICATION

This application claims the benefit of U.S. Provisional Patent Application No. 61/975,308 entitled "Sleeve Applicator Machine and Related Method of Operation" filed on Apr. 4, 2014. The contents of that application are hereby incorporated by reference for all purposes as if set forth in their entirety herein.

FIELD OF INVENTION

This disclosure relates to machines for opening tubular sleeves or other tubular markers for placement around elongated objects such as wires.

BACKGROUND

Tubular sleeve markers are often used to mark elongated objects such as wires so that the wires can be distinguished from one another. Most commonly, such markers are employed when many wires are being used or the wires are run over long distances as, in both situations, it may be difficult to establish the different ends of a single wire.

In some instances, the tubular sleeve markers are prepared and presented in a flat configuration in which the tube form is pressed together to be flattened with creased axially-extending edges. The sleeves may be provided in flat form for a number of reasons including to make the sleeves more compact for shipping, to better permit the attachment of multiple sleeves into a single strip, and to accommodate printing on the sleeve. When the sleeve has been folded to be flat, in order to apply the sleeve around the wire, the sleeve is pinched to open the central opening of the sleeve for insertion of the wire.

However, the application of tubular sleeve markers to wires is often a time-consuming and frustrating practice given the relatively small size of many sleeves and the dexterity required to apply the sleeve to the wire.

SUMMARY

In order to improve the efficiency with which tubular sleeves can be applied to wires or other elongated objects, the following machine has been created. Among other things, this machine removes much of the manual labor associated with sleeve attachment such as the handling and pinching of the sleeve as well as the threading of the sleeve onto the wire or other elongated object. In this way, the process of attaching the sleeve to a wire is made more efficient and, further, many of the downsides that could result from repetitive motion such as soreness or injury are avoided.

According to one aspect of the invention, a sleeve applicator machine is disclosed for removing and opening a sleeve from a carrier that supports a plurality of unopened sleeves. The sleeves are removable from the carrier for application around an elongated object such as a wire. The sleeve applicator machine includes a feed mechanism for advancing the carrier along a feed path extending into and through a sleeve removal section of the sleeve applicator machine, an actuatable mandrel subassembly positioned in the sleeve removal section of the machine for removing an unopened sleeve from the carrier and introducing the unopened sleeve into a sleeve opening section, and a separable pair of sleeve-opening dies in the sleeve opening section that compress and open the sleeve so that a wire or other elongated object can be inserted into the opened sleeve.

To provide more detail about the machine, the actuatable mandrel subassembly of the machine includes a mandrel and an actuator operatively connected to the mandrel for actuation or movement of the mandrel relative to the carrier and the sleeves supported thereon. The mandrel has a shaft with a leading tip at one end thereof for entering a central opening of one of the plurality of unopened sleeves. During operation of the machine, the actuator actuates, moves, or slides the leading tip of the mandrel into the central opening of one of the unopened sleeves of the carrier. The mandrel is then actuated to lift and separate the unopened sleeve on the mandrel from the carrier and to present the sleeve into a sleeve opening section of the sleeve applicator machine. When the mandrel with the unopened sleeve thereon enters the sleeve opening section, the separable pair of sleeve-opening dies is initially in an opened position such that the unopened sleeve is positioned between the separable pair of sleeve-opening dies. With the unopened sleeve in place between the opened dies, the dies are then moved from the opened position into a closed position, thereby bringing the separable pair of sleeve-opening dies together to compress and open the unopened sleeve therebetween to open the sleeve on the mandrel.

With the dies closed and the sleeve opened, the mandrel may be withdrawn, either fully or in part, from the closed pair of sleeve-opening dies. By removing the mandrel, the central opening of the opened sleeve is cleared while the sleeve is held open by the closed sleeve-opening dies. This accommodates the insertion of the elongated object (for example, the wire) into the central opening of the sleeve.

Before the mandrel is inserted into the sleeve, the machine may provide a gust or charge of air or gas to prime the opening of the sleeve. In some forms, the actuatable mandrel subassembly may further include a positive pressure source and the mandrel may include a passage having an opening proximate the leading tip of the mandrel in which the opening is in selective communication with the positive pressure source. During the movement of the mandrel, the mandrel may initially be placed near the carrier or be lightly depressed onto the carrier to establish the relative position of the mandrel to the sleeve. With the mandrel in this position near or on the carrier, but before the mandrel is moved into the central opening of the unopened sleeve, the positive pressure source may selectively provide a charge of gas to the central opening to initially separate walls of the unopened sleeve to better accommodate the insertion of the mandrel. Of course, a charge of air might be provided in alternative ways that do not necessarily involve the mandrel.

The separable pair of sleeve-opening dies may be oriented in a way that minimizes the distance the mandrel must travel to transport the removed sleeve from the carrier to the space between the dies or may include features that promote the opening of the sleeve on the mandrel. For example, in some forms, the separable pair of sleeve-opening dies may be separable along a direction that is substantially parallel to the direction of the feed path of the carrier and may be separable in a direction that is generally perpendicular to the direction of mandrel movement during the lifting action. Further, in some forms, the separable pair of sleeve-opening dies each may include a semi-circular section for contacting and opening the sleeve on the mandrel. In this way, when the dies are closed, a generally cylindrical cavity may be created with a generally circular cross section in which the sleeve is received for opening. It is contemplated in some forms that the semi-circular section on each of the separable pair of sleeve-opening dies may include a linear slotted guide for engagement with a folded edge of the unopened sleeve (as a flattened sleeve will typically have two fold lines separated by 180 degrees from one another and the guides may be generally parallel with one another and the axis of the cylindrical form in which the sleeve is received).

Further, it is contemplated that the separable pair of sleeve-opening dies may be removable from the sleeve applicator machine and replaceable with another separable pair of sleeve-opening dies. The separable pair of sleeve-opening dies may be held in place using a pin for locating and a magnet or may be latched into place. Each of the different pairs of dies may accommodate a differently sized sleeve, as the machine might be designed to accommodate various sizes of sleeves. Similarly, different size mandrels may potentially be used to lift the sleeves from the carrier or the mandrels may be differently shaped (i.e., of non-circular cross section through the mandrel's central axis) in order to better engage the sleeve on the carrier. For example, the geometry of the mandrel may be flattened out to help prevent larger sleeves from rotating on the mandrel.

Much of the machine may be automated such that, after minimal instruction from the end user, the machine performs the remaining steps. In this regard, the machine may include a controller programmed to perform the steps described herein. For example, the controller may be programmed to actuate the actuator to move the leading tip of the mandrel into the central opening of one of the unopened sleeves of the carrier, to lift and separate the unopened sleeve from the carrier using the mandrel into a sleeve opening section of the sleeve applicator machine in which the separable pair of sleeve-opening dies are in the opened position, and to move the pair of sleeve-opening dies to the closed position around the mandrel and the unopened sleeve supported thereon in order to open the sleeve. Still yet, the controller may be programmed to withdraw the mandrel from the separable pair of sleeve-opening dies after the separable pair of sleeve-opening dies are placed in the closed position to accommodate the insertion of the object into the central opening of the sleeve in the sleeve-opening dies.

Further, if a controller is present, the controller may be programmed to advance the feed mechanism in order to advance the carrier. In instances where the machine is able to handle various sizes of sleeves, the controller may be programmed to provide differential distances of advancement to accommodate for different sizes and spacing of unopened sleeves on the carrier.

According to another aspect of the invention, a related method is disclosed of using a sleeve applicator machine to remove and open a sleeve from a carrier supporting a plurality of unopened sleeves removable therefrom for application around an elongated object. A mandrel is moved into an opening of one of the unopened sleeves supported by the carrier to place at least a portion of the mandrel in the opening of the unopened sleeve. The mandrel inserted in the unopened sleeve is lifted relative to the carrier, thereby separating the unopened sleeve from the carrier and moving the sleeve into a sleeve opening section of the sleeve applicator machine in which the unopened sleeve on the mandrel is disposed between a separable pair of sleeve-opening dies in an opened position. The separable pair of sleeve-opening dies is moved from the opened position into a closed position in which the separable pair of sleeve-opening dies are brought together. This thereby compresses and opens the unopened sleeve between the dies.

In some forms, the method may further include withdrawing the mandrel from the sleeve after the sleeve has been opened in the separable pair of sleeve-opening dies. With the mandrel removed or withdrawn from the sleeve, the elongated object may be inserted into the sleeve while the sleeve is held open by the closed dies.

The motion of the mandrel or its related actions may be controlled prior to entering the central opening of the sleeve. In one form, a leading tip of the mandrel may be pressed against the carrier prior to moving the mandrel into the opening of one of the unopened sleeves by sliding the mandrel into the opening.

In some forms, the method may further include providing a charge of gas via the mandrel to the central opening of the unopened sleeve on the carrier. This charge may initially separate walls of the unopened sleeve to accommodate the insertion of the mandrel into the opening before the mandrel is moved into the central opening of the unopened sleeve.

In some forms of the method, the carrier may be advanced along a feed path using a feed mechanism to introduce one of the plurality of unopened sleeves supported by the carrier into a sleeve removal section of the sleeve applicator machine at which location one of the plurality of unopened sleeves is positioned to be received on the mandrel. It is contemplated that, in some forms, a direction of the feed path may be substantially parallel to a direction of which the separable pair of sleeve-opening dies are separable (i.e., the feed path may be in the same direction that the dies open) and that, in some forms, a direction of lifting the unopened sleeve from the carrier by the mandrel may be substantially perpendicular to the direction of the feed path (i.e., the direction of lifting the sleeve may be perpendicular to the feed path).

It will be appreciated that the plurality of unopened sleeves may be adhesively joined to the carrier such that, during the lifting and separation of the unopened sleeve from the carrier using the mandrel, an adhesive attachment between the unopened sleeve and the carrier is broken.

These and still other advantages of the invention will be apparent from the detailed description and drawings. What follows is merely a description of some preferred embodiments of the present invention. To assess the full scope of the invention the claims should be looked to as these preferred embodiments are not intended to be the only embodiments within the scope of the claims.

BRIEF DESCRIPTION OF THE DRAWINGS

FIGS. 6A through 6D are cross sectional views of the sleeve being lifted into the open dies and the dies closing around the sleeve to open the sleeve.

DETAILED DESCRIPTION

Figure 1:
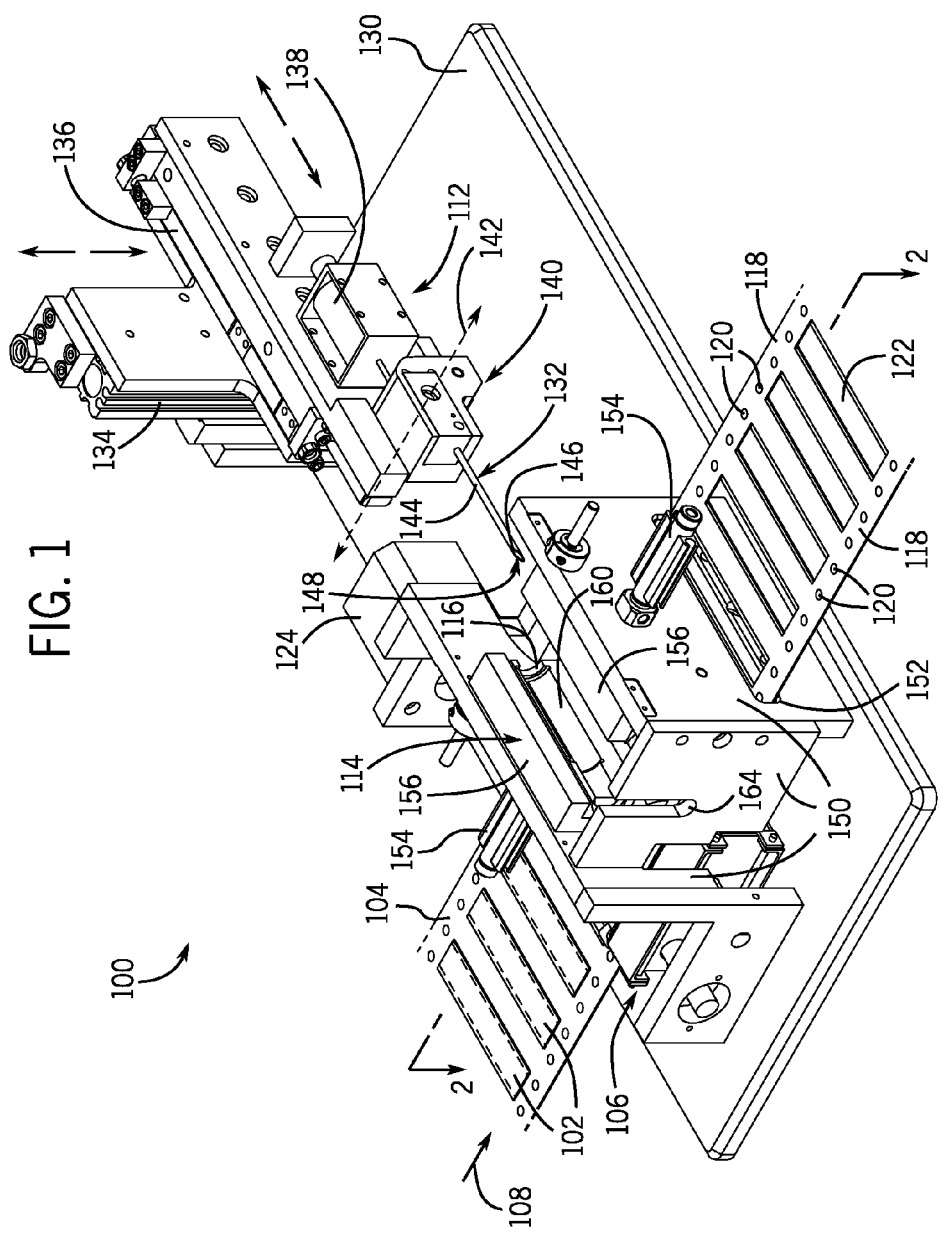
FIG. 1 is a perspective view of the sleeve applicator machine with a carrier supporting sleeves running through it.

Referring first to FIG. 1, a sleeve applicator machine 100 is shown for removing sleeves 102 from a carrier 104. It will be appreciated that the sleeve applicator machine 100 illustrated is but one exemplary embodiment of a sleeve applicator machine that falls within the scope of the claimed invention and that various modifications and variations may be made to the machine without deviating from the scope of the invention.

Figure 2:
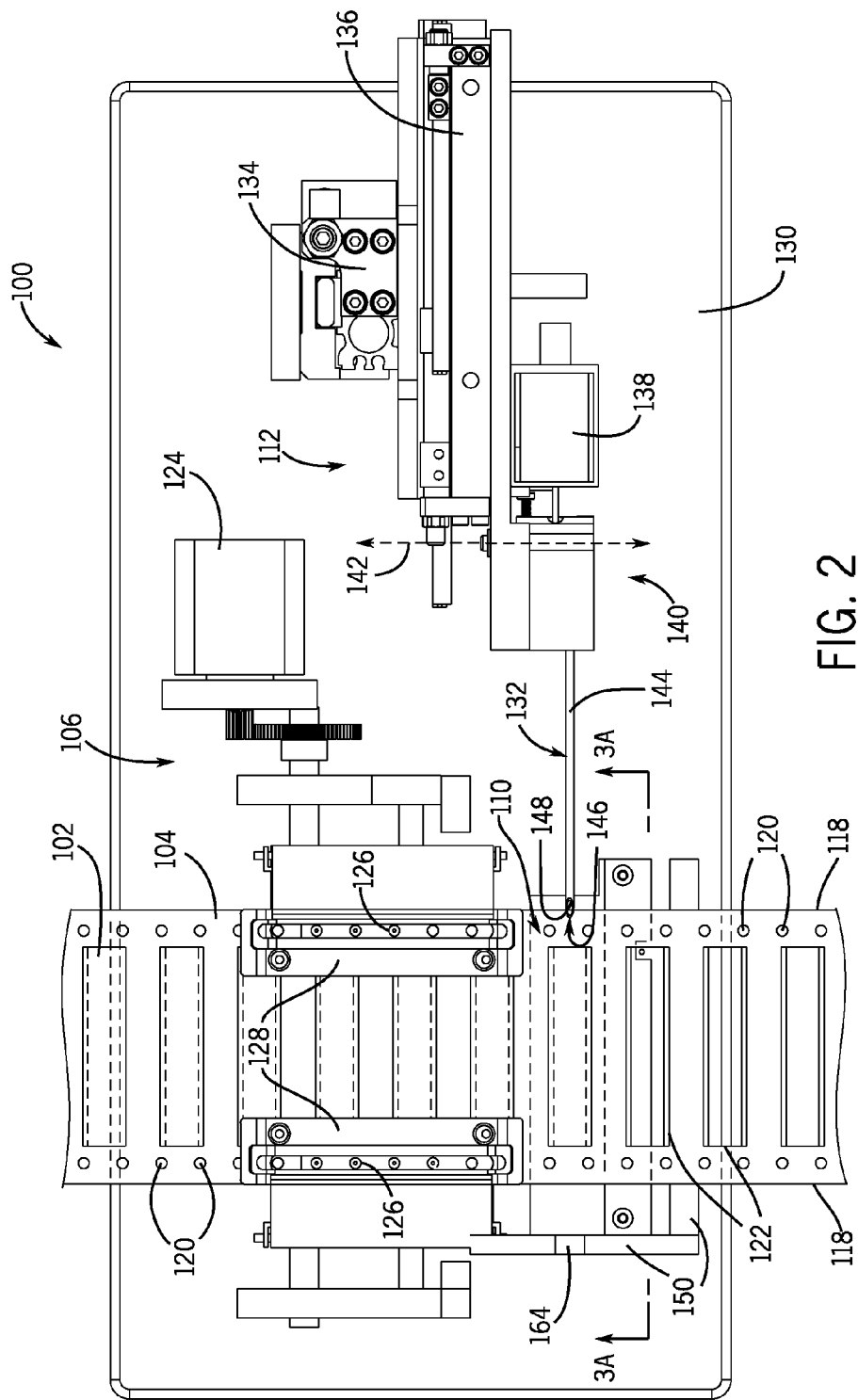
FIG. 2 is a top view of the sleeve applicator machine taken along line 2-2 of FIG. 1 which effectively removes the sleeve opening section from obscuring the view of the feed mechanism and the carrier beneath it.

To provide context for the description of the specific structure of the machine 100 that follows, a brief description of the operation and function of the machine will be provided with additional reference to FIG. 2. FIG. 2 is a top view of the machine 100 from FIG. 1, but with certain parts removed to better illustrate the pathway of the carrier 104 through the machine 100.

The sleeve applicator machine 100 transports the carrier 104 through the machine 100 using a feed mechanism 106 along a feed path 108. Such transport may be intermittent, with the carrier 104 periodically being advanced an amount equal to a center-to-center distance between two adjacent sleeves 102. The feed mechanism 106 transports the carrier 104 through a sleeve removal section 110 of the machine 100. In the sleeve removal section 110, an actuatable mandrel subassembly 112 is used to engage and lift one of the unopened sleeves 102 from the carrier 104. This removed sleeve 102 is lifted into a sleeve opening section 114 of the machine 100, in which a separable pair of sleeve-opening dies 116 is closed around the sleeve 102 to compress and open the sleeve 102. At this point, the actuatable mandrel subassembly 112 can be withdrawn from the sleeve 102, and a wire or other elongated object can be centrally inserted into the sleeve 102 while the dies 116 hold the sleeve 102 open.

Looking more closely at the carrier 104 in FIGS. 1 and 2, it can be seen that the carrier 104 is a generally sheet-like strip having a length dimension that runs parallel to the direction of the feed path 108 and a width dimension that runs between a pair of lateral edges 118 of the carrier 104. Near each of the pair of lateral edges 118 there are a row of openings 120 (also sometimes referred to as a pin feed) in the carrier 104 that run parallel to the corresponding lateral edge 120. These rows of openings 120 facilitate the transport of the carrier 104 in a manner similar to the way in which rows of openings on continuous paper have been used to transport paper in dot matrix printers.

In the particular form illustrated, the plurality of unopened sleeves 102 are centrally disposed along a row on a top side of the carrier 104 and aligned such that the central axis of each of sleeves 102 are perpendicular to the lateral edges 118 of the carrier 104. The central axes are regularly spaced along the length dimension of the carrier 104 such that the center-to-center distance between the sleeves 102 is similar. Such spacing and orientation may be altered without deviating from the scope of the invention.

The sleeves 102 are folded or formed to be flat prior to their attachment on the carrier 104. As the sleeves 102 are generally tubular in shape and typically composed of an elastic, flexible material, this can mean that two opposing sides of the inner diameter of the sleeves 102 can be brought together such that lines of edge or fold are spaced 180 degrees from one another. By placing the flattened sleeves 102 upon the carrier 104, this can accommodate printing on the sleeves 102 (for identification) at an upstream process location or make the carrier 104 easier to ship and handle as it is generally planar in form even with the sleeves 102 attached.

Although not expressly shown in the illustration, an adhesive element or elements can provide a temporary attachment between the unopened sleeves 102 and the carrier 104. In the form illustrated, there are laterally-extending rectangular openings 122 over which the sleeves 102 are received (before their removal from the carrier 104 in the sleeve removal section 110 of the machine 100). In one form, to removably attach the sleeves 102 to the carrier 104, strips of adhesive tape may be attached to a bottom side of the carrier (sticky side up) such that portions of the adhesive are positioned on the lateral ends of the rectangular openings 122. Accordingly, during the production process of the carrier 104, when one of the sleeves 102 is placed over a respective one the rectangular openings 122 and pressure is applied, the bottom side of the sleeve 102 may contact and be adhered to the adhesive tape at the ends of the sleeve 102. Of course, this is but one exemplary way of adhesively and removably attaching the unopened sleeves 102 to the carrier 104 and it is contemplated that other ways and configurations of removably attaching the sleeves 102 to the carrier 104 may be employed.

Now looking more closely at the specific parts of the machine 100, the carrier 104 is transportable through the machine 100 using the feed mechanism 106, which is best shown in the top view of FIG. 2 in which the sleeve opening section 114 including the separable pair of sleeve-opening dies 116 has been removed from the view. As noted earlier, the feed mechanism 106 resembles a drive mechanism used in older dot matrix printers for transporting continuous paper sheets (in which sheets were commonly folded at perforations and the rows of openings on the edges of paper could be removed at perforated lines). In the illustrated feed mechanism 106, a motor 124 is operatively connected by a drive train to two parallel tractor feeds 126. These tractor feeds 126 contain endless rows or loops of outwardly-facing conical spikes aligned along the direction of the feed path 108. The conical spikes on each of the tractor feeds 126 receive the rows of openings 120 on the carrier 104. Top flaps or guards 128 are folded down over the tractor feeds 126 and the rows of openings 122 on the carrier 104 to capture and retain the carrier 104 between the tractor feeds 126 and the top guards 128.

When the carrier 104 is received in the tractor feeds 126 and the motor 124 is operated, the tractor feeds 126 are co-rotated in the same direction resulting in the movement of the carrier 104, whose openings 120 are engaged by the moving spikes of the tractor feeds 126. In this way, the carrier 104 can be spatially advanced or reversed along the feed path 108.

In typical operational use, the feed mechanism 106 may be programmed to advance the carrier 104 a distance equal to the center-to-center spacing of the sleeves 102 on the carrier 104 to advance one of the sleeves to the sleeve removal section 110. As noted above and will be described in greater detail below in the sleeve removal section 110, the actuatable mandrel subassembly 112 is used to remove one of the sleeves 102 from the carrier 104 at a time and, by controlling the advancement of the sleeves 102 along the feed path 108, a particular sleeve may be positioned with respect to the actuatable mandrel subassembly 112 for removal.

It is contemplated that, in some forms of the machine, there may be a presence sensor that detects the presence of a sleeve on the carrier in the lift-off position (that is, the position along the feed path at which the sleeve is liftable from the carrier by the mandrel). This presence sensor can aid in automation by, for example, detecting the presence or absence of a sleeve on the carrier in the lift-off position. If, for example, at the start of the lift-off processes no sleeve is present in the lift-off position, then the feed mechanism may advance the carrier to the next sleeve on the carrier before actuating the mandrel. This can prevent the operational cycle from being performed without a sleeve present. Further, it is contemplated that this presence sensor might be used after the mandrel attempts to lift the sleeve from the carrier. If, after the sleeve should have been lifted from the carrier by the mandrel, the sleeve is still detected as present on the carrier, then the machine may be programmed to repeat the lift off step using the mandrel or to advance the carrier to the next sleeve position before repeating the sleeve lift-off.

It will be appreciated that the feed mechanism 106 as well as the various other components or actuators of the machine 100 may be connected to a controller programmed to perform the movements of the machine 100. With respect to the feed mechanism 106, it is contemplated that the controller by way of user-operated controls may be made to move the carrier 104. In this regard, it is contemplated that there may be various different types of carriers and sleeves and that the dimensions of advancement, the spacing of the sleeves 102 on the carrier 104, and so forth may be varied. Thus, it is contemplated that the controller or user-operated controls may be configured to account for these differences in the carrier or the sleeves in the operation of the machine. Further, it is contemplated that some aspects of control or configuration of the machine 100 may result from either manual user input or may result from the use of sensors or other inputs to identify the carrier without specific user input (that is to say, the machine may detect the type of carrier automatically and vary operational parameters such as advancement distance accordingly).

Further, it will be appreciated that while interaction of the spiked tractor feeds 126 with the openings 120 of the carrier 104 is illustrated as one way of moving or transporting the carrier 104, that other ways of transporting the carrier 104 (or alternative carrier structures) are also contemplated. As one possible example, rollers may be used to nip portions or the full width of a carrier to move the carrier along the feed path.

It will be appreciated that, in some forms, the carrier 104 might be of any length and carry any number of sleeves 102. In some forms, it is contemplated that the carrier may be continuously dispensed from a roll. In other forms, the carrier might be a discrete length.

Now, with continued reference to both FIGS. 1 and 2, the various parts of the actuatable mandrel subassembly 112 will be described in greater detail. In the form illustrated, the actuatable mandrel subassembly 112 is mounted relative to the feed mechanism 106 via a shared base or frame 130. While the frame 130 is a single plate as illustrated, multi-part frames or other more complex structures may be used to position the actuatable mandrel subassembly 112 relative to the feed path 108 of the carrier 104. Although the actuatable mandrel subassembly 112 is mounted to the frame 130, a mandrel 132 of the actuatable mandrel subassembly 112 is actuatable relative to the frame 130 (and, thus, to the feed mechanism 106 which is fixed to the frame 130 and the carrier 104 whose position is defined relative to the feed mechanism 106). The mandrel 132 is actuatable through the use of one or more actuators in order to permit the mandrel 132 to engage the sleeve 102 on the carrier 104 that is positioned in the sleeve removal section 110 of the machine 100.

In the particular form illustrated, there are three actuators: a first vertically-aligned actuator 134 that establishes and varies the vertical height or position of the attached mandrel 132, a second horizontally-aligned actuator 136 that establishes a horizontal position of the mandrel 132, and a third actuator 138 that connects to a pivotable mandrel supporting structure 140 which is pivotable about axis 142 depending on the position of the actuator 138. In the illustrated embodiment, this third actuator 138 is a linear actuator. This third actuator 138 permits a shaft 144 of the mandrel 132 to be moved between a substantially horizontal position and one in which a leading tip 146 of the mandrel 132 is slightly lowered toward the carrier 104 relative to the pivotable mandrel supporting structure 140 and the axis 142. For the sake of clarity, in the illustrated embodiment, the vertical direction is substantially perpendicular to the plane of the carrier 104, the horizontal direction is substantially perpendicular to the vertical direction as well as is substantially perpendicular to the lateral edges 118 of the carrier 104, and the axis of rotation 140 is substantially perpendicular to both the vertical direction and the horizontal direction. By this combination of actuators, the mandrel 132 is provided with a plane of motion and further, to a limited degree, is rotatable within that plane of motion.

In the particular form illustrated, the various actuators are pneumatically actuated (although the pneumatic lines are not illustrated so as to not confuse the illustration of the assembly) and can be separately controlled by a programmed controller based on the instructions relating to the intended movement of the mandrel 132. Of course, it is contemplated that other numbers and forms of actuators could be employed to achieve a similar effect in regards to mandrel movement.

It should also be observed that, in the form illustrated, the leading tip 146 of the mandrel 132 includes an opening 148 which is in selective fluid communication with a pressure source (not shown). A controllable valve may temporarily place the pressure source in communication with the opening 148 at the tip 146 of the mandrel 132 to provide a gust or charge of gas from the tip of the mandrel 132.

Returning now to FIG. 1 (and with additional forward reference to FIGS. 4A-4D, 5, and 6A-6D), the sleeve opening section 114 of the machine 100 will be described in greater detail. The sleeve opening section 114 is disposed above the sleeve removal section 110 of the machine 100. In the particular form illustrated, sidewalls 150 mounted to the frame 130 expend upward therefrom to support the separable pair of sleeve-opening dies 116. To accommodate the passage of carrier 104 along the feed path 108 through the sidewalls 150, clearances or openings 152 may be formed in one or more of the sidewalls 150. Linear actuators 154 are mounted to the sidewalls 150 such that the pair of sleeve-opening dies 116 can be opened or closed between the sidewalls 150 by the actuators 154. As with the other actuators, the actuators 154 may be pneumatically operated and a controller may be programmed to effectuate their opening or closing.

It is contemplated that some or all of the sleeve opening section may be movable relative to the rest of the machine in such a way that portions of the sleeve applicator machine can be made more accessible (for servicing, loading the carrier into the feed mechanism, or other such operations) when the machine is not in operation. For example, the section of the machine that causes the dies to actuate may be rotatable, translatable, or otherwise movable such that the section of the machine below it such as the mandrel and feed mechanism are available for servicing. In this way, the machine can be made more compact and not require a user to try to wedge his or her hands into small spaces within the machine.

Figure 5:
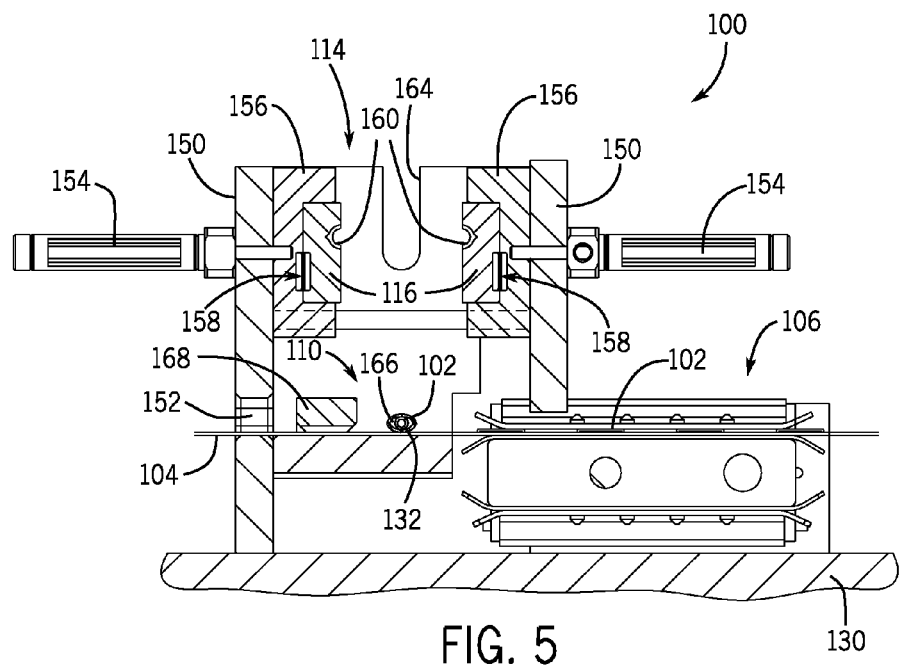
FIG. 5 is a sectional view of the mandrel inserted into one of the sleeves on the carrier with the dies in an opened position above the unopened sleeve.

As best illustrated in FIG. 5, the halves of the sleeve-opening dies 116 may be received in intermediate support clamps or blocks 156 that are directly connected to the actuators 154. The dies 116 may be secured in the clamps 156 in a number of ways. As illustrated, paired magnets 158 received in the dies 116 and the blocks 156 hold the respective components of each of the halves together. By the use of magnets 158, the dies 116 may be retained in the clamps 156 during operation, but the dies 116 may also be removed in order to permit the substitution of dies sized for the opening of differently-sized sleeves. It is contemplated that the magnetic connection might be replaced with other forms of mechanical attachment such as, for example, fasteners.

As can be best seen in FIGS. 5 and 6A through 6D, each of the dies 116 includes a semi-circular section 160 for contacting and opening one of the sleeves. When brought together, these semi-circular sections 160 will form a negative space in a form that is generally cylindrically-shaped. However, there are also a linear edge guide 162 formed in each of these semi-circular sections 160 that may engage and generally guide the opposing fold lines of the sleeve 102 during the closure of the dies 116.

The sidewalls 150 can also include a sidewall parallel to one of the lateral edges 118 of the carrier 104 that structurally reinforces the front and rear sidewalls that extend perpendicular to the feed path 108 and that support the actuators 152 and the dies 116. In the form illustrated, this sidewall parallel to the feed path 108 may have a slot 164 formed therein that accommodates the insertion of a wire or other elongated object into the closed dies 116 as will be described in greater detail below. However, it will be appreciated that other forms of the machine can have different housings or covers over the dies, the wire opening may be built into these housing elements or covers rather than or in addition to a sidewall as depicted in the illustrations.

With the various parts of the machine 100 having been described above, the specific operation of the machine 100 will now be described in greater detail. As noted above, the operation may generally include a feed step, a sleeve removal step, a sleeve opening step, and a wire insertion step.

Even before the feed step, it is contemplated that there may be an upstream printing step in which the sleeves 102 on the carrier 104 are printed on in order to provide identifying information on the sleeves 102. If such a printing step occurs, then it may either occur in a separate machine or it may be bodily integrated into the machine 100.

During the feed step, the feed mechanism 106 advances the carrier 104 loaded into the machine 100 along the feed path 108 extending into and through the sleeve removal section 110 of the sleeve applicator machine 100. As noted above, this can occur when a controller instructs the motor 124 to co-rotate the spiked tractor feeds 126, thereby driving the movement of the carrier 104 by engagement of the spiked tractor feeds 126 with the openings 120 of the carrier 104. It is contemplated that in most situations, once the carrier 104 has been loaded into the feed mechanism 106, that the carrier 104 will be advanced a distance equal to a center-to-center spacing of the sleeves 102 on the carrier 104 such that, after one of the sleeves 102 has been removed by the mandrel 132, the next unopened sleeve 102 can be advanced to a location at which it can be removed by the mandrel 132. However, more complex feed arrangements may be utilized including advancing and/or retracting. For example, in more complexly-controlled arrangements, the sleeves 102 may be pre-printed with different labels on the various sleeves and it may be advantageous to remove the sleeves 102 from the carrier 104 out of their spatially-arranged order on the carrier 104.

In any event, once the desired sleeve 102 is positioned in the sleeve removal section 110 of the machine 100, then the actuatable mandrel subassembly 112 is used to remove and separate the desired unopened sleeve 102 from the carrier 104. Turning now to FIGS. 3A through 3D, the various steps of the sleeve removal from the carrier 104 by the mandrel 132 are illustrated.

Figure 3A:
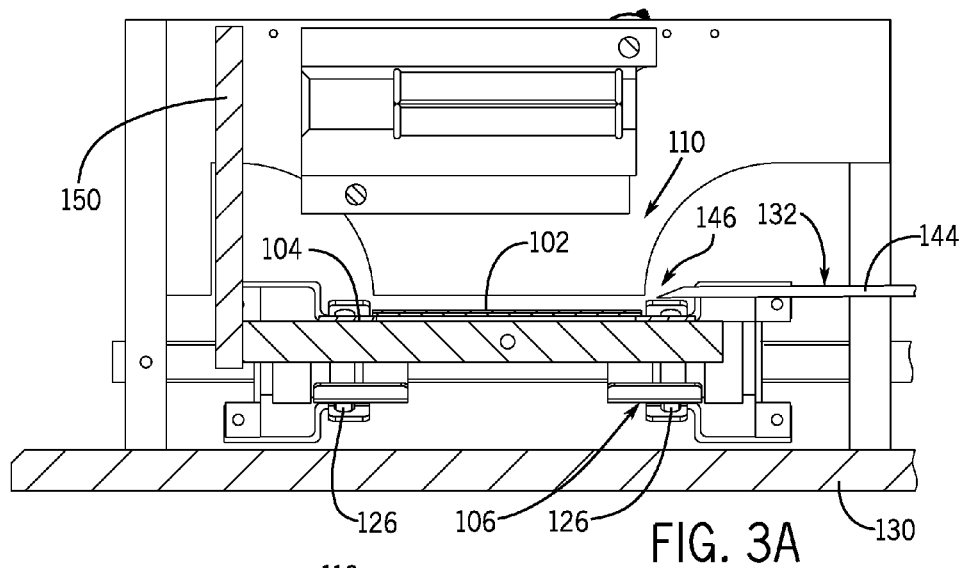
FIG. 3A through 3D are side views of a mandrel or skewer engaging an unopened sleeve on the carrier and lifting the sleeve to separate the sleeve from the carrier.

In FIG. 3A, in which the machine 100 and mandrel 132 are viewed from the exit side of the feed path 108 of the machine 100, the mandrel 132 has been actuated using the first vertically-aligned actuator 134 and the second horizontally-aligned actuator 136 in order to locate the mandrel 132 just above the carrier 104 on the right side of the carrier 104. In this initial position, the leading tip 146 of the mandrel 132 is positioned above and to the right of the sleeve 102. It will be appreciated that the mandrel 132 may be moved to the position illustrated in FIG. 3A (or to another position in relatively close proximity to the carrier 104) from another position in which the mandrel 132 is initially spaced further from the carrier 104.

Figure 3B:
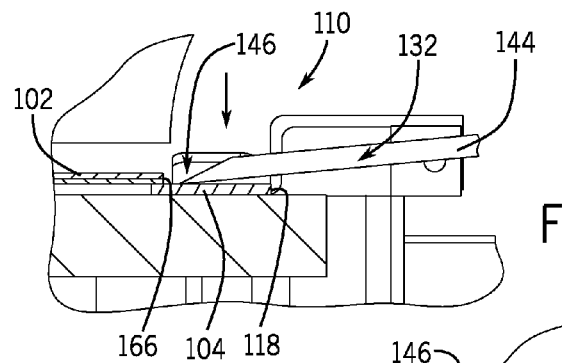

From this position or a similar position, the mandrel 132 is then actuated such that the leading tip 146 of the mandrel 132 is moved down to lightly contact and depress the carrier 104 on its upper surface just to the right of the sleeve 102 as illustrated in FIG. 3B. With additional reference being made to the greater structure of the sleeve applicator machine 100 illustrated in FIGS. 1 and 2, this movement can be achieved by adjusting the position of the mandrel 132 using one or both of the first vertically-aligned actuator 134 that adjusts the height of the mandrel 132 or the third actuator 138, that when actuated, effectuates the downward pivoting of the mandrel 132 by rotating the pivotable mandrel supporting structure 140 about axis of rotation 142. It will be appreciated that rotation of a pivotable mandrel supporting structure 140 might also occur in other ways such as, for example, a direct drive of the rotation of the structure supporting the mandrel rather than by use of a linear actuator. Having the mandrel 132 enter the sleeve 102 at a downward angle can improve the consistency with which the mandrel 132 is inserted into the sleeve 102.

It will be appreciated that the pivotable mandrel supporting structure 140 may provide a downward pivoting of the leading tip 146 of the mandrel 132, but also may resist further pivoting action after a predetermined amount of resistance is met. Further, there is a hard stop past which the pivotable mandrel supporting structure 146 is not pivotable. Thus, when the tip 146 is contacted against an upper surface of the carrier 104 and the mandrel 132 encounters sufficient resistance to further rotation or the hard stop, the mandrel 132 may be prevented from being over-driven into the carrier 104, potentially damaging the mandrel 132 and/or the carrier 104.

In some forms, the pivotable mandrel support structure 140 and the mandrel 132 supported thereon may be biased such that the shaft 144 of the mandrel 132 is urged toward a generally horizontal orientation. In such an arrangement, the force of the actuator (such as the third actuator 138) may be used to temporarily overcome the biasing force and effectuate the pivoting of the mandrel 132 on the pivotable mandrel support structure 140.

Figure 3C:
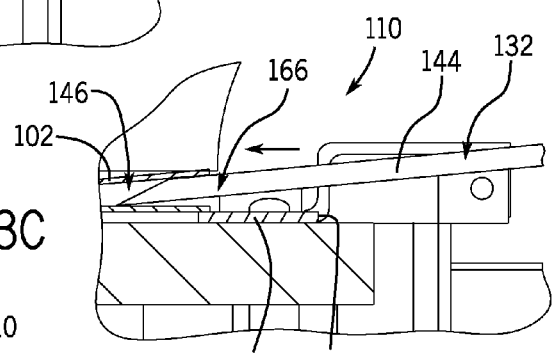

In any event and regardless of the particular mechanical manner in which the leading tip 146 of the mandrel 132 is actuated to this or a similar position, the leading tip 146 of the mandrel 132 is positioned adjacent to or next to a central opening 166 of the unopened sleeve 102. With the tip 146 of the mandrel 132 in this position, the opening 148 on the tip 146 of the mandrel 132 may provide a charge or gust of air or other gas to prime the central opening 166 of the unopened sleeve 102 for the impending insertion of the mandrel 132. This charge of gas can blow apart the top and bottom walls of the unopened sleeve 102 to help enlarge the space therebetween for reception of the mandrel 132. In some forms of the method, the gas may continue to be supplied from the tip 146 even while the mandrel 132 is actuated forward to be received in the sleeve 102 as illustrated in FIG. 3C. The continued supply of gas during the insertion of the mandrel 132 into the sleeve 102 helps the mandrel 132 to slide through the sleeve 102 more effectively and reduces the possibility that the mandrel 132 tears the sleeve 102 as they engage one another due to friction or snagging. In this sense, the gas almost acts as a lubricant.

Turning now to FIG. 3C, the mandrel 132 is illustrated as being moved into the central opening 166 of the sleeve 102. This motion of the mandrel 132 may occur by the operation of the second horizontally-aligned actuator 136. Typically, this step involves threading the mandrel 132 into at least part of the central opening 166 of the sleeve 102 and, in many instances, entirely through the central opening 166 of the sleeve 102.

It is contemplated that, when the mandrel 132 is being inserted into the central opening 166 of the sleeve 102, the motor 124 may be temporarily unlocked thereby permitting the sleeve 102 with the ability to self align to a certain extent. For example, if the motor 124 is a stepper motor, the motor can be unlocked to permit the carrier 104 the ability to move some distance forward or backward along the feed path 108 to better accommodate the insertion of the mandrel 132 into the central opening 166 of the sleeve 102 disposed on the carrier 106 so that the central axis of the mandrel 132 and the central opening 166 sleeve 102 are better aligned with one another during the insertion step.

In the instance in which the mandrel 132 is inserted to the central opening 166 of the sleeve 102 at an angle (as illustrated in FIG. 3C), it is contemplated that the mandrel 132 may be made to "pop" from the angled position to a roughly horizontal position during the course of insertion. This might be achieved, for example by removing the force that overcomes a biasing force to keep the mandrel 132 at an angled position such that the biasing force causes the sudden upward rotation of the mandrel 132. When this pop occurs, the sudden upward rotation of the mandrel 132 may even cause a first part of the adhesive bond to break on one side of the sleeve 102. After the "pop", then the further insertion of the mandrel 132 into the sleeve 102 is unlikely to result in the tip 146 of the mandrel 132 catching on the carrier 104 at the exit end of the central opening 166 of the sleeve 102.

Figure 3D:
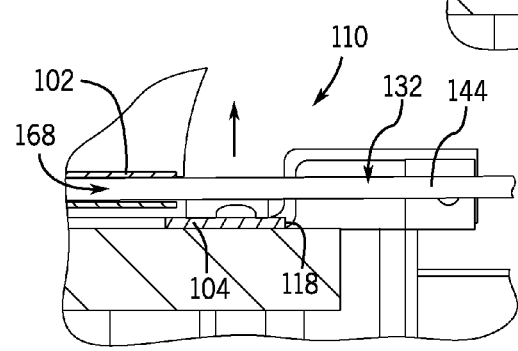

With the shaft 144 of the mandrel 132 received in the central opening 166 of the sleeve 102, the mandrel 132 is then actuated upward to lift and separate the sleeve 102 received on the mandrel 132 from the carrier 104 as illustrated in FIG. 3D. To achieve this upward motion of the mandrel 132, the first vertically aligned actuator 134 may be actuated to move the mandrel 132 away from the carrier 104. With this upward motion, any adhesive bond holding the sleeve 102 to the carrier 104 is broken.

It is contemplated that this lifting step can occur with the mandrel 132 at a slight angle to permit the sleeve 102 to peel from the carrier 104. For example, an adhesive bond on the axial end of the sleeve 102 in which the mandrel 132 is first inserted may be broken before another adhesive bond on the other axial end of the sleeve 102. This means the sleeve 102 may be lifted and separated from one lateral side of the carrier 104 before the other by the mandrel 132. This peeling action may be beneficial because it can potentially reduce the upward force that must be applied in order to separate the sleeve 102 from the carrier 104, as the upward force is less to break only a portion of the bond at different times, rather than the entire bonding force at once.

It should be appreciated that, during this separation step, the sleeve 102 is fully separated from the carrier 104 by the lifting action of the mandrel 132. To achieve this separation and to prevent the carrier 104 from lifting with the sleeve 102, the carrier 104 may be held in place (or relatively in place) in one or more ways. In the illustrated embodiment, keeping the carrier 104 in place is achieved at least in part by the use of spiked tractor feeds 126 which, when rotationally locked, prevent the carrier 104 from advancing further forward along the feed path 108, which also limits the upward distance that the carrier 104 might be pulled since the carrier 104 is locked in position at the end of the feed mechanism 106. Further, the carrier 104 might be made from a relatively stiff material (for example, of thicker stock or weight) that does not significantly deviate from the feed path 108 upon the upward force of the mandrel 132 and, moreover, may be separately braced from upward displacement by physical stops 168 (such as, for example, that illustrated in FIG. 5) on one or both of the opposing sides on the mandrel 132 that inhibit the upward movement of the carrier 104 when the mandrel 132 is lifted.

At this point in the process, with the sleeve 102 having been removed from the carrier 104 and being disposed on the mandrel 132, the sleeve 102 is still not fully opened as the pre-folded nature of the sleeve 102 causes the shape of the sleeve 102 to tend towards a closed state even when the sleeve 102 is on the mandrel 132 (as the mandrel 132 has a diameter that is less than the inner diameter of the sleeve 102 when the sleeve 102 is made fully round). In order to fully open the sleeve 102 on the mandrel 132, the mandrel 132 lifts the sleeve 102 into the sleeve opening section 114 of the machine 100 at which location the sleeve 102 will be further opened and the mandrel 132 withdrawn such that a wire 168 or other elongated object can be inserted into the central opening 166 of the sleeve 102. These further opening steps are illustrated in FIGS. 4A through 4D and FIGS. 6A through 6D.

Figure 4A:
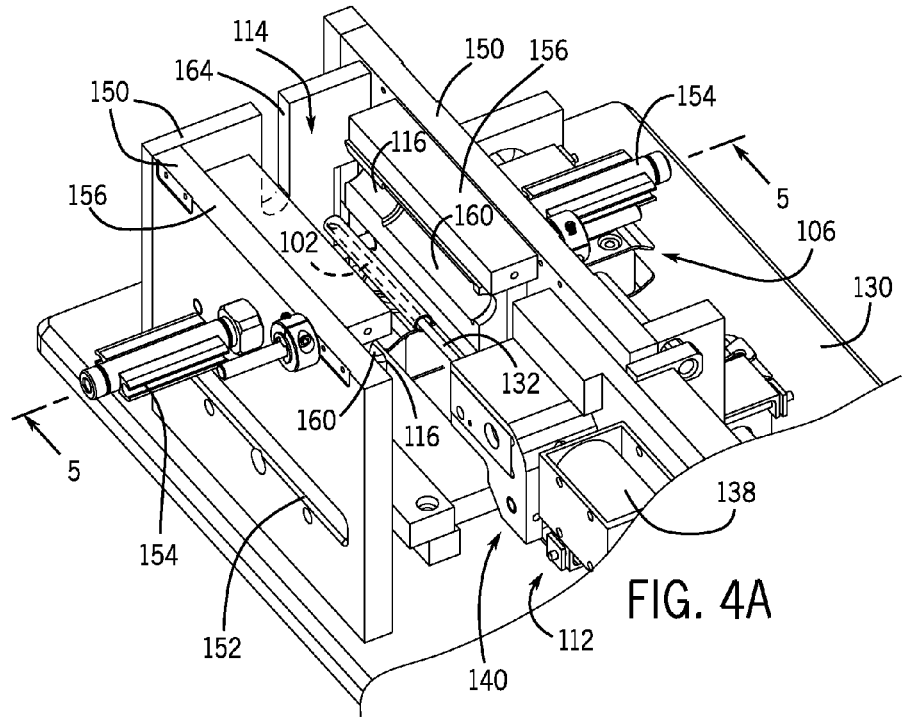
FIGS. 4A through 4D are views of the removed sleeve on the mandrel being compressed and opened by the dies.
Figure 6A:
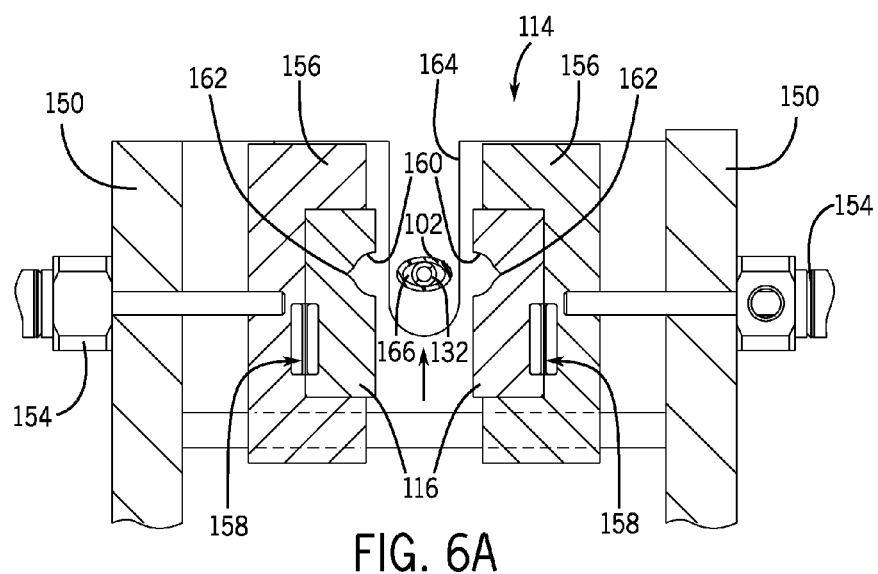

With the mandrel 132 in the sleeve 102, the separated sleeve 102 on the mandrel 132 is lifted from the position illustrated in FIG. 5 into the space between the two opened and separated dies 116 as illustrated in FIGS. 4A and 6A. In this position, the dies 116 are separated from one another by the retracted state of the two actuators 154 connected thereto.

Figure 4B:
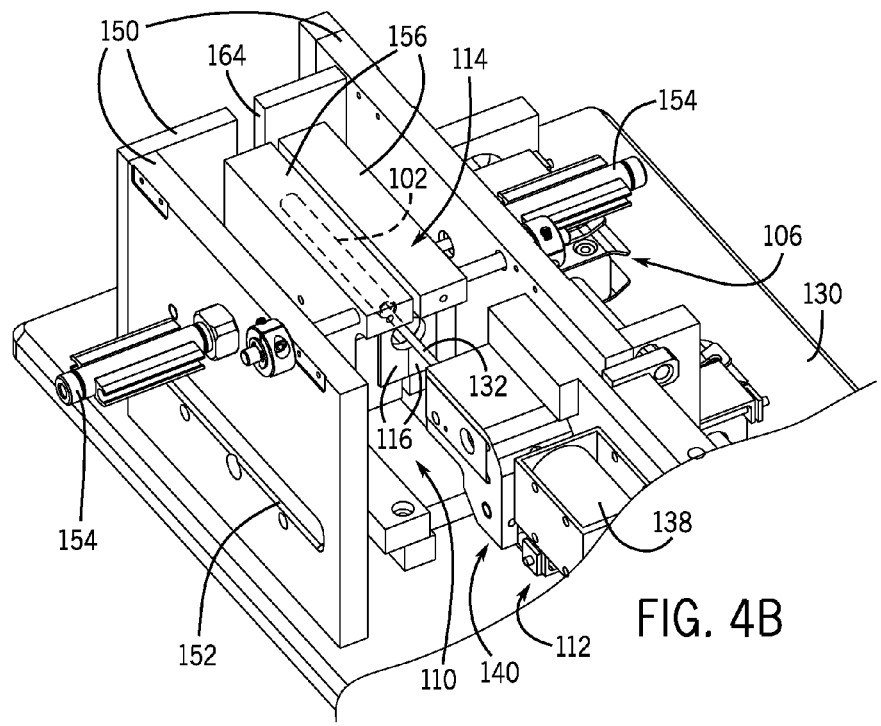

With the mandrel 132 and sleeve 102 centrally placed between the two dies 116, the two dies 116 are actuated towards one another to a closed position as illustrated in FIGS. 4B and 6C, thereby capturing the mandrel 132 and the sleeve 102 between the dies 116. This actuation of the dies 116 occurs by the extension of the actuators 154 that move the opposing clamps or blocks 114 and the dies 116 received therein towards one another until the dies 116 contact a hard stop.

As can be seen in FIG. 6B, which is an intermediate position between the opened position of the dies 116 illustrated in FIG. 6A and the fully closed position illustrated in FIG. 6C, the linear edge guides 162 on the semi-circular sections 160 of the dies 116 may first engage the folded edge portions of the sleeve 102 on the mandrel 132 in order to improve the control with which the sleeve 102 is opened. The interaction of these edge guides 162 with the fold lines of the sleeve 102 may also help to reduce the likelihood that the sleeve 102 angularly rotates on the mandrel 132 before the dies 116 are fully closed. If this rotation were to occur, then the walls of the sleeve 102 may collapse when the dies 116 close (that is, one of the radially-outward surfaces of the sleeve 102 may fold back towards or onto itself). If such a collapse occurs, then the user cannot insert the wire or other object into the central opening 166 of the sleeve 102 when the mandrel 132 is withdrawn, as the central opening 166 will not be fully opened. Alternatively, if the sleeve 102 rotates on the mandrel 132, then it is possible the folded edges of the sleeve 102 might get caught between the contacting die surfaces, thereby preventing the dies 116 from fully closing and preventing the sleeve 102 from being properly compressed and opened.

Returning to fully closed die position of FIGS. 4B and 6C and as best seen in FIG. 6C, when the dies 116 are fully brought together or closed, the semi-circular sections 160 of the dies 116 are brought together to form a cylindrical negative space. This cylindrical negative space generally corresponds to the size of the open sleeve 102 when the sleeve 102 is compressed and opened by the semi-circular sections 160 of the dies 116 to place the sleeve 102 in a generally tubular form with a circular outer circumference. Again, as mentioned above, the dies 116 may be replaceable to have sections 160 of different sizes and shapes to accommodate differently sized or shaped sleeves 102 or elongated objects. For that matter, the mandrel 132 may also be replaceable to better receive differently sized or shaped sleeves.

Figure 4C:
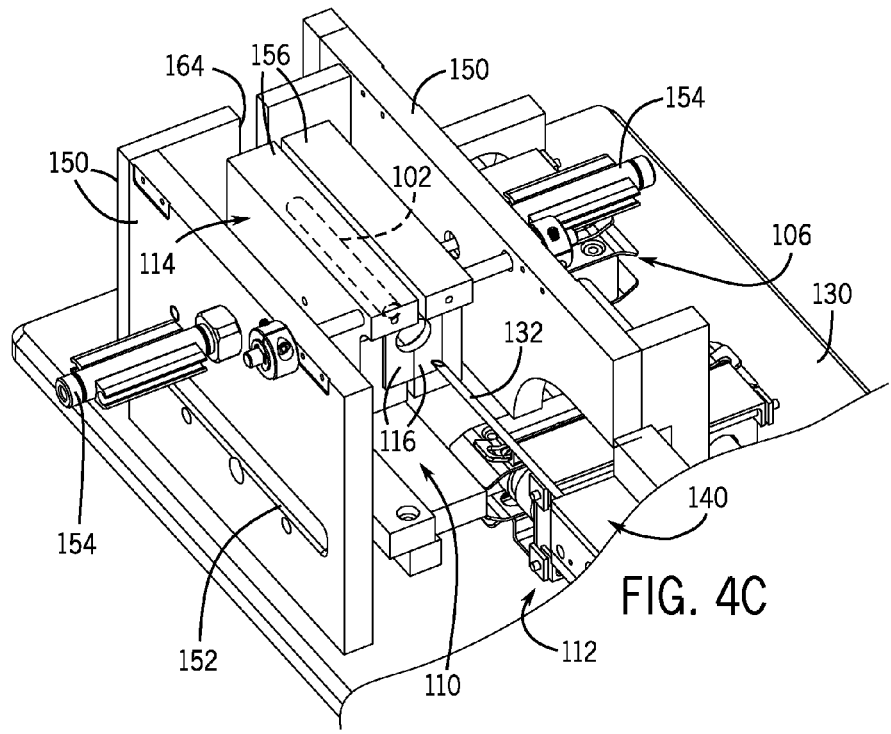

With the dies 116 closed around the open sleeve 102, the mandrel 132 is withdrawn as illustrated in FIGS. 4C and 6D. The withdrawal of the mandrel 132 can occur by use of the second horizontally-aligned actuator 136, but could also be achieve, for example, by movement of the closed dies 116 relative to the mandrel 132. As the mandrel 132 is withdrawn, the dies 116 remain closed and axial ends walls of the cylindrical negative space formed by the semi-circular sections 160 of the dies 116 can prevent the sleeve 102 from axially traveling with the mandrel 132 out of the closed dies 116 as the mandrel 132 is withdrawn. This separates and strips the sleeve 102 from the mandrel 132, while retaining the sleeve 102 in the closed dies 116 with the sleeve 102 in an opened and compressed state.

Figure 4D:
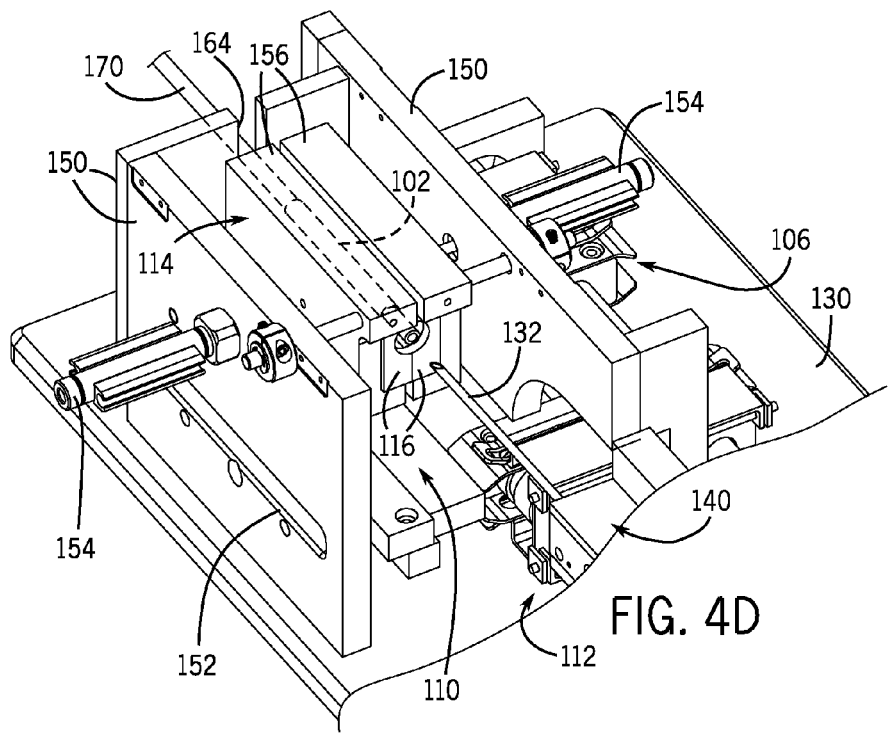

With the mandrel 132 withdrawn, a wire 170 or other elongated objected can now be inserted through the slot 164 in the sidewall 150 into the central opening 166 of the opened sleeve 102 while the sleeve 102 is held opened in the closed dies 116 as illustrated in FIG. 4D. With the sleeve 102 in place around the inserted wire 170 or other object, the dies 116 can then be opened by retracting the actuators 154. The wire 170 with sleeve 102 attached can then be removed from the machine 100 and any further steps associated with attachment of the sleeve 102 to the wire 170 may be performed. For example, additional steps might include the application of heat for shrink-fitting the sleeve 102 to the wire 170, the attachment of an end connector to an end of the wire 170, or the direct connection of the wire 170 to a terminal or other object.

Thus, a sleeve applicator machine and related method of use are disclosed which may advantageously avoid the difficulties associated with manually attaching the sleeves to a wire or other object and further improve the efficiency with which the sleeves can be opened.

Variations to the specific embodiment of the machine described above are contemplated.

For example, although an actuator is described above as actuating a mandrel relative to the feed mechanism and the separable pair of sleeve opening dies, is contemplated that the mandrel might be made stationary and that the other components (that is, the feed mechanism and/or the separable pair of sleeve opening dies) might move or be actuated relative to the stationary mandrel to achieve the same effect. In this case, the same relative motion of the components might occur, even though one or more components other than the mandrel are being moved.

As another example of a modification to the machine, in a simplified form of the machine, it is contemplated that a sleeve might be applied to the mandrel by the user and that the separable pair of sleeve opening dies may be closed around the mandrel in order to open and compress the sleeve. In this instance, the only components that might need to be actuated or moved would be the separable pair of sleeve opening dies after the sleeve has been placed on the mandrel. In such a variation, the feed mechanism and the components associated with the actuation of the mandrel might be omitted from the machine altogether. Of course, the omission of these other components, at least to some extent lessens the productivity gain achieved by the automation of the sleeve onto the mandrel.

In still another contemplated variation, a pair of opposing mandrels may be made to enter or slide into the respective pair of central openings on the two ends of the sleeve in order to engage the sleeve from different lateral ends before the sleeve is lifted and separated from the carrier. Accordingly, once the dies are closed around the sleeve and mandrels, one or both of the opposing mandrels could then be withdrawn to permit wire insertion.

Still yet, it is contemplated that the machine may further include a wire insertion mechanism that automatically inserts a wire into the central opening of the sleeve after the sleeve has been opened. This could further automate the process.

As noted above, it should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A sleeve applicator machine for removing and opening a sleeve from a carrier supporting a plurality of unopened sleeves removable therefrom for application around an elongated object, the sleeve applicator machine comprising:

a feed mechanism for advancing the carrier along a feed path extending into and through a sleeve removal section of the sleeve applicator machine;

an actuatable mandrel subassembly in the sleeve removal section of the sleeve applicator machine, the actuatable mandrel subassembly comprising:

a mandrel having a shaft with a leading tip at one end thereof for entering a central opening of one of the plurality of unopened sleeves; and an actuator operatively connected to the mandrel for actuation of the mandrel relative to the carrier;

wherein the actuator is actuatable to move the leading tip of the mandrel into the central opening of one of the unopened sleeves of the carrier and further to lift and separate the unopened sleeve from the carrier using the mandrel into a sleeve opening section of the sleeve applicator machine;

a separable pair of sleeve-opening dies in the sleeve opening section of the sleeve applicator machine, the separable pair of sleeve-opening dies having an opened position into which the actuatable mandrel subassembly lifts the unopened sleeve on the mandrel to place the unopened sleeve between the separable pair of sleeve-opening dies and a closed position in which the separable pair of sleeve-opening dies are brought together to compress and open the unopened sleeve therebetween.

2. The sleeve applicator machine of claim 1, wherein the separable pair of sleeve-opening dies are separable along a direction that is substantially parallel to the direction of the feed path.

3. The sleeve applicator machine of claim 1, wherein the actuatable mandrel subassembly further includes a positive pressure source and the mandrel includes a passage having an opening proximate the leading tip of the mandrel in which the opening is in selective communication with the positive pressure source and wherein, before the mandrel is moved into the central opening of the unopened sleeve, the positive pressure source selectively provides a charge of gas to the central opening to initially separate walls of the unopened sleeve to accommodate the insertion of the mandrel.

4. The sleeve applicator machine of claim 1, further comprising a controller in which the controller is programmed to actuate the actuator to move the leading tip of the mandrel into the central opening of one of the unopened sleeves of the carrier, to lift and separate the unopened sleeve from the carrier using the mandrel into a sleeve opening section of the sleeve applicator machine in which the separable pair of sleeve-opening dies are in the opened position, and to move the pair of sleeve-opening dies to the closed position around the mandrel and the unopened sleeve supported thereon in order to open the sleeve.

5. The sleeve applicator machine of claim 4, wherein the controller is further programmed to withdraw the mandrel from the separable pair of sleeve-opening dies after the separable pair of sleeve-opening dies are placed in the closed position to accommodate the insertion of the object into the central opening of the sleeve in the sleeve-opening dies.

6. The sleeve applicator machine of claim 4, wherein the controller is programmed to advance the feed mechanism to advance the carrier and wherein the controller is programmed to provide differential distances of advancement to accommodate for different sizes and spacing of unopened sleeves on the carrier.

7. The sleeve applicator machine of claim 1, wherein the separable pair of sleeve-opening dies each include a semi-circular section for contacting and opening the sleeve on the mandrel.

8. The sleeve applicator machine of claim 7, wherein the semi-circular section on each of the separable pair of sleeve-opening dies includes a slotted guide for engagement with a folded edge of the unopened sleeve.

9. The sleeve applicator machine of claim 1, wherein the actuator is actuatable to move the leading tip of the mandrel to depress the carrier before the actuator slides the leading tip of the mandrel into the central opening of one of the unopened sleeves of the carrier.

10. The sleeve applicator machine of claim 1, wherein the separable pair of sleeve-opening dies are removable from the sleeve applicator machine and replaceable with another separable pair of sleeve-opening dies for a differently sized sleeve.

11. The sleeve applicator machine of claim 1, wherein the mandrel is removable from the actuatable mandrel subassembly and replaceable with a mandrel of at least one of a different size and shape to accommodate a differently-sized sleeve.

* * * * *